Patented Oct. 6, 1936

2,056,795

UNITED STATES PATENT OFFICE 2,056,795

CELLULOSE ETHER COMPOSITIONS AND PROCESS OF PREPARING SAME

Maurice L. Macht, Jersey City, and Alan F. Randolph, Montclair, N. J., assignors, by mesne assignments, to E. I. du Pont de Nemours & Company, Wilmington, Del., a corporation of Delaware No Drawing. Application April 26, 1934, Serial No. 722,484

7 Claims. (Cl. 106—40)

This invention relates to cellulose ether compositions and the process of preparing same and, more particularly, to granulated molding compositions comprising cellulose ethers with or without other ingredients.

Molding compositions in granular form must fulfill certain conditions to be commercially acceptable. The ingredients of the compositions must be thoroughly blended together homogeneously to such a degree that an article subsequently molded from the mixture shall be of uniform composition and texture throughout, and of uniform color, that is, free from aggregates of undispersed coloring matter and from spots deficient in color. These compositions must be in granular to pulverulent condition to facilitate the handling. Customarily in molding shop practice the charges for the individual molds are made up by passing the granular compositions through a preforming or pelleting machine which automatically measures out a predetermined weight of the material and compresses the loose granular material into a hard and durable preform, this preform being much more readily loaded into the die than would be the material in its granular form.

Not only must the molding composition be in granular form but, in order to satisfactorily handle it in the preforming machines, it must not be too voluminous, that is to say, the granular material must have a sufficiently high bulk density, by which term is meant the apparent density of a granular molding compound in an untamped, loose condition, generally expressed in weight per unit volume as in the mixed term grams per cubic inch. The granular material must be in such condition as to feed readily by gravity from the hopper to the cavity of the pelleting machine and must not contain an undue proportion of fines which tend to cause the jamming of the plunger in the cavity of the pelleting machine by building up in the narrow clearance provided between them. Moreover, the granular material must not contain any individual particles of comparatively large size, as then the operation of the pelleting machine will be defective in that the automatic device which levels off the individual charge of material in the cavity will not accurately level material containing very coarse particles.

Heretofore various methods have been proposed for the preparation of molding compositions having a cellulose ether base which compositions have, in general, the properties outlined above but all of these methods suffer from material disadvantages of one sort or another, either as to the difficulty and expense of manufacture or as regards the quality of the products made.

An object of the present invention is to provide a simple and economical process of producing cellulose ether compositions particularly adapted for use in molding. A further object is to provide such a process wherein the cellulose ethers are prepared in a novel form peculiarly adapted for granulation and use in molding operations. A still further and more specific object is to provide a process of producing ethyl cellulose compositions particularly adapted for use in molding. Other objects of the invention will be apparent from the description given hereinafter.

The above objects are accomplished according to the present invention by kneading a cellulose ether in suitable comminuted form, usually with the addition of a plasticizer unless the particular cellulose ether being treated is relatively thermoplastic by itself, at least until a homogeneous, compacted, coherent mass is obtained, and subsequently breaking said mass down into granular form. Preferably the cellulose ether, with or without plasticizer and various other auxiliary ingredients, is kneaded in a masticator mixer under positive pressure.

There are two alternative specific methods of carrying out this invention, each of which presents certain advantages over the other. In both methods the cellulose ether, with or without plasticizers and other ingredients, is kneaded until a homogeneous, compacted, coherent mass is obtained but in one method the kneading is stopped when the mixture is formed into a substantially homogeneous, cellulose, friable mass which is more or less spongy and non-transparent (even in the absence of insoluble ingredients), the mass removed from the kneading apparatus and broken down into granular form; in the other method the kneading action is continued further until the known, fully colloided, rather tough, horny mass is formed, which is removed from the kneading apparatus and subsequently broken down into granular form.

When the kneading is stopped at the point where the cellulous, friable mass is obtained, the mass can be remove from the mixer and easily reduced to granular form even while still hot from the kneading operation, whereas if the kneading is continued to give a fully colloided mass, then the mass must be cooled down to room temperature ordinarily to break it down into granular form. The mass produced according to the first alternative form of the invention, besides obviously not being fully colloided throughout, is distinctly cellulous, that is, it contains innumerable small cells or cavities. Despite this characteristic cellulous structure, the mass is well compacted and, when broken down into granular form, has a satisfactorily high bulk density, although not generally as high as the bulk density of the fully colloided material when broken down into granular form of the same mesh.

Masticator mixers are well known in the art, the "Banbury" mixer being a prominent example. In these masticator mixers the masticating action is largely produced by having a very small clearance between the blades of the mixer and the adjacent wall and forcing the material being mixed down into the small clearances by means of a pressure ram. The term "under positive pressure" is used herein in its customary sense in this art, namely, that a pressure ram, or equivalent device, is forcing the mixture down into the clearances between the blades of the mixer and the adjacent wall whereby an exceptionally strenuous masticating action is effected. Because of the strenuousness of this masticating or kneading action the cellulose ether, with or without additional ingredients, is in a few minutes time thoroughly homogenized and brought to the cellulous, friable form above described and upon only a few minutes more kneading the material is brought into the fully colloided state, whereas using mixing rolls it requires far more time and high temperatures to produce the fully colloided mass. As far as known, the cellulous, friable mass above described has never been obtained heretofore.

In carrying out the process ordinarily the mixture introduced into the masticator mixer and the mixer itself are at normal temperatures but the temperature of the mixture, due to friction, immediately begins to rise when the mixer is set in motion. Ordinarily the temperature of the mixture will not rise above 85° C. in the few minutes required to form the homogeneous, cellulous, friable mass above described and it is preferred that the temperature should not be allowed to materially exceed about 100° C. or 105° C. where it is desired to stop the kneading when the material has reached this state. On the other hand, if it is desired to produce the fully colloided material, the temperature will rise during the somewhat longer kneading operation (which nevertheless is only a matter of a few minutes) to the neighborhood of 110° C. and, in order to prevent any deleterious effects due to excessive temperatures, it is preferred that the temperature of the mixture should not be allowed to materially exceed 135° C., although this may be done under careful operating conditions without injury.

The following examples are given in order to illustrate specific embodiments of the present invention, parts being given by weight:—

*Example 1.*—A preliminary mixture was made as follows:

| | Parts |
|---|---|
| Ethyl cellulose (in finely divided form) | 100 |
| Triphenyl phosphate | 4 |
| Diamyl phthalate | 8 |
| Titanium dioxide | 0.2 |

This mixture was made by stirring together the ingredients for a short period in a light powder mixer.

The preliminary mixture thus obtained was introduced into a Banbury mixer in sufficient quantity to fill the mixer to such a point that the pressure ram of the mixer operated to produce pressure upon the contents during the kneading operation. The mixer was set into motion with the pressure ram in operating position to exert a pressure of 10–50 pounds per square inch on the mass within the mixer and the mixing was continued until a homogeneous, cellulous, friable mass was formed, the mixture becoming heated by internal friction but the temperature of the plastic mass not exceeding 76° C. in the two minutes kneading required. The mass obtained was somewhat spongy in appearance and was readily broken to pieces by hand even immediately upon removal from the mixer while still hot. The cellulous, friable mass was then broken down into a granular molding powder by being passed through a rotary grinder. There resulted a granular molding compound having the satisfactory bulk density of 6.6 grams per cubic inch and a screen analysis as given below, which compound pelleted satisfactorily in a standard pelleting machine and which, when molded in a heated die under pressure, yielded a molded article uniform in appearance and strength.

*Screen analysis*

| | Percent |
|---|---|
| On 10-mesh | 0.0 |
| 20-mesh | 37.5 |
| 40-mesh | 44.4 |
| 60-mesh | 13.4 |
| 80-mesh | 2.7 |
| 100-mesh | 1.0 |
| Through 100-mesh | 0.8 |

The ethyl cellulose employed in this example, as well as in the other examples herein given, was in finely divided form and had an ethoxyl content of approximately 50.

*Example 2.*—A second batch of the ethyl cellulose mixture employed in Example 1 was kneaded in the Banbury mixer beyond the point at which the cellulus, friable mass was obtained and, at the end of five minutes kneading, had been formed into a dense, horny, fully colloided mass, the temperature of the mass by that time having risen to about 132° C. The resulting product, after removal from the Banbury mixer and being cooled to room temperature, was ground by means of a rotary grinder and yielded a granular molding compound of bulk density 6.4 grams per cubic inch and of a screen analysis as given below, which compound pelleted satisfactorily and which, when molded in a heated die under pressure, yielded a molded article similar to that described in Example 1. The screen analysis was as follows:

*Screen analysis*

| | Percent |
|---|---|
| On 10-mesh | 0.7 |
| 20-mesh | 75.7 |
| 40-mesh | 21.3 |
| 60-mesh | 2.0 |
| 80-mesh | 0.2 |
| 100-mesh | 0.1 |
| Through 100-mesh | 0.2 |

By comparison of the bulk density of the material produced in Examples 1 and 2 it can be seen that, despite the cellulous, friable structure of the mass at the time kneading was stopped in Example 1, the mixture had been compacted and gave a molding powder having nearly the same bulk density as that shown in Example 2, when the difference in screen analysis is taken into consideration. This is not always true, the bulk density of the fully colloided material tending to be higher when ground to the same mesh.

*Example 3.*—The following mixture was processed as set forth in Example 1:—

| | Parts |
|---|---|
| Ethyl cellulose | 100 |
| Triphenyl phosphate | 18 |
| Titanium dioxide | 0.5 |
| Hydrated chromium oxide | 0.1 |

The mixture was kneaded in the Banbury for two minutes causing a gradual rise of temperature of the mass to about 67° C. A cellulous, friable mass obviously in an incompletely colloided condition was obtained which, upon grinding, gave a bulk density of 5.9 grams per cubic inch and a screen analysis as given below. This compound was satisfactorily pelleted and produced articles of uniform strength and appearance upon being molded.

*Screen analysis*

| | Percent |
|---|---|
| On 10-mesh | 3.4 |
| 20-mesh | 75.5 |
| 40-mesh | 17.6 |
| 60-mesh | 2.7 |
| 80-mesh | 0.3 |
| 100-mesh | 0.2 |
| Through 100-mesh | 0.3 |

*Example 4.*—A mixture of

| | Parts |
|---|---|
| Ethyl cellulose | 100 |
| Dibutyl phthalate | 15 | was processed for two minutes in a Banbury mixer as described in Example 1, the temperature of the mass rising to about 95° C. At the end of this time a cellulous, friable mass was obtained which was removed from the mixer and immediately ground to give a granular molding compound having a bulk density of 6.5 grams per cubic inch and a screen analysis as follows:

*Screen analysis*

| | Percent |
|---|---|
| On 10-mesh | 4.6 |
| 20-mesh | 75.1 |
| 40-mesh | 17.5 |
| 60-mesh | 1.7 |
| 80-mesh | 0.3 |
| 100-mesh | 0.2 |
| Through 100-mesh | 0.3 |

*Example 5.*—A mixture as given below was processed according to Example 1:

| | Parts |
|---|---|
| Ethyl cellulose | 100 |
| Triphenyl phosphate | 6 |
| Diamyl phthalate | 9 |
| Alizarine purple lake B | 0.2 |

This mixture was kneaded in a Banbury mixer for two minutes at the end of which time a cellulous, friable mass was obtained. Upon removing the mass from the mixer it was ground to give a molding powder having a bulk density of 6.4 grams per cubic inch and a screen analysis as follows:

*Screen analysis*

| | Percent |
|---|---|
| On 10-mesh | 11.9 |
| 20-mesh | 71.2 |
| 40-mesh | 14.4 |
| 60-mesh | 2.1 |
| 80-mesh | 0.4 |
| 100-mesh | 0.3 |
| Through 100-mesh | 0.3 |

The following examples are given to illustrate other specific embodiments of the invention, the processing in general being carried out as set forth in Example 1:—

*Example 6.*—The mixture employed was:

| | Parts |
|---|---|
| Ethyl cellulose | 100 |
| Diamyl phthalate | 11 |

The mixture was kneaded for 1½ minutes, giving a cellulous, friable mass which was readily broken down into granular form.

*Example 7.*—The mixture employed was:

| | Parts |
|---|---|
| Ethyl cellulose | 100 |
| Dicyclohexyl phthalate | 11 |

The mixture was kneaded for 1 minute, at the end of which period a cellulous, friable mass was obtained which was readily broken down to give a granular molding powder.

*Example 8.*—The mixture employed was:

| | Parts |
|---|---|
| Ethyl cellulose | 100 |
| Triphenyl thiophosphate | 11 |

The mixture was kneaded for 2 minutes, at the end of which time a fully colloided mass was obtained. This mass was broken down to granular form after removal from the mixer and cooling to room temperature.

It is to be understood that the above examples merely illustrate specific methods of carrying out the present invention and specific compositions adapted for use in the present invention, which invention broadly relates to the treatment of cellulose ethers generally. In place of the ethyl cellulose recited in the examples, other alkyl celluloses may be substituted wholly or in part, or aryl celluloses such as benzyl cellulose, or unsaturated cellulose ethers such as allyl or crotonyl cellulose. In order to be exact in the specific examples, the ethoxyl content of the cellulose employed was given but, as will be understood by those skilled in the art, ethyl cellulose for use in molding powders, sheeting, and the like, frequently has an ethoxyl content varying from about 40–52. The ease of working the ethers will, of course, depend to some extent upon the particular ether employed and its solubility in the plasticizer employed, appreciable differences being noticed even in ethers having the same ether group but containing a different proportion of ether groups per glucose unit of the cellulose.

In order to satisfactorily work these ethers in the kneading apparatus, it is preferred that they be employed in a finely divided state or in such a state that they will readily be disintegrated to finely divided form at the beginning of the kneading cycle. Cellulose ethers in comminuted but not pulverulent form can be employed although they have a tendency to make it more difficult to satisfactorily knead the mixture and get a uniform, homogeneous product in a short period of time.

Certain of the cellulose ethers, for example, benzyl cellulose, possess such a degree of thermoplasticity in themselves that the finely divided ether may be introduced into the kneading apparatus without the addition of plasticizers and be worked into a homogeneous, compacted, coherent mass. With such ethers the inclusion of a plasticizer is optional. Almost invariably coloring matter, either a soluble dye or a pigment, will be mixed with the cellulose ether although this is not a necessary element of the invention. As indicated in the examples given, a wide variety of plasticizers may be employed; the following are listed as being suitable:—

Camphor, naphthalene, triphenyl phosphate, tricresyl phosphate, acetanilid, mono chloronaphthalene, butyl salicylate, ethyl butyrate, butyl benzoate, phenyl phthalate, ethyl aceto acetate, cyclohexanol, acetophenone, butyl tartrate, ethyl succinate, diphenyl ether, ethyl lactate, isoamyl butyrate, triacetin, triethylene glycol, mono-phenyl ether of ethylene glycol, tri-m-oxyphenyl phosphate, diphenyl ethane, diphenylol cyclohexane, benzene monomethyl sulfonamid, methyl acetanilid, di-xylyl ethane, ethyl acetanilid, benzyl cresyl ether, diamyl phthalate, dibutyl phthalate, thiotriphenyl phosphate.

As will be apparent to those skilled in the art, other auxiliary ingredients besides plasticizers and coloring matter may be included in the cellulose ether compositions being kneaded, depending upon the effect and properties of the molding composition desired. Fillers may be included such as talc, china clay, wood flour, cotton flock, asbestos, and the like, as well as the so-called "effect" materials such as bronze powders and pearl essence. Also fire retardants such as hydrated magnesium carbonate and gypsum, antacids, e. g., urea; agents conferring hygroscopicity, e. g., zinc chloride, and various other modifying agents such as China-wood oil, resins, e. g. gum accroides and ester gum, and various other plastics such as cellulose esters, casein, rubber, synthetic resins, and the like. Mold lubricants such as aluminum palmitate, calcium stearate, and stearic acid, as well as waxes such as carnauba wax, may also be included.

The proportion of plasticizer employed with the cellulose ether will be determined by the properties desired in the resulting composition rather than with reference to the process of the present invention. Where molding powders and the like are being prepared, the amount of plasticizer customarily lies between 5–15% by weight of the composition and rarely above 20%, where no filler is employed, the plasticizer content being raised ordinarily if fillers are to be used. For certain purposes much larger percentages of plasticizer may be required. In some instances, a plasticizer content as high as 40 or 45% is desired in manufacturing sheet stock for certain purposes. The choice of other additional ingredients and the proportions thereof to be used in these cellulose ether compositions will likewise be determined primarily by the desired properties in the finished product.

To practice the present invention in one form, the mixture comprising the cellulose ether must be formed into a substantially homogeneous, cellulous, friable mass but the further change into the ordinary horny, continuous, fully colloided mass should be avoided. It is found that these cellulose ethers become fully colloided, particularly with active plasticizers, as the temperature of the mass is increased and, consequently, high temperatures should preferably be avoided unless a fully colloided mass is desired and, even where a fully colloided mass is desired, it is not advisable to use excessive temperatures inasmuch as they may injuriously affect the composition, whereas the time of the kneading cycle even to make a fully colloided mass is a matter of rarely more than 5–8 minutes with the time for the kneading cycle in preparing the cellulous, friable mass even less.

In general it has been found that there is no need to greatly exceed a temperature of 100 or 105° C. in forming the cellulose ethers into the cellulous, friable form, or to greatly exceed a temperature of 135° C. to form the fully colloided mass.

Where the composition and the mixer are at room temperature at the start, it has been found that positive cooling means are usually not required. The mixture does heat up due to internal friction but the short time required to form the mass into the desired state does not, as a rule, permit the temperature of the mixture to rise to a point where it is injurious. Where successive batches are being run through the mixer without allowing the mixer to cool, it may heat up to such a point that the mixture will, because of the heat absorbed from the mixer, reach the cellulous, friable form before the ingredients have become homogeneously mixed; if the batch is being run to produce the cellulous friable form of the plastic, it would then, under these conditions, be preferred to employ positive cooling means. Likewise positive cooling means would preferably be employed if the resin reached the fully colloided state well in advance of the time at which a substantially homogeneous mixture was obtained.

Positive heating means are unnecessary in the kneading apparatus as the internal friction due to the kneading automatically supplies the heat necessary but they may be advantageously employed if the mixture shows a tendency to become completely homogeneous before the desired degree of colloidalization is reached. By supplying external heat colloidalization is accelerated and thus the length of the kneading cycle may be shortened. Ordinarily no appreciable advantage will be gained by supplying external heat except where no plasticizer is employed, or where a relatively inactive one, or a relatively small proportion of a more active plasticizer, is employed.

Those skilled in this art will readily appreciate whether the use of positive heating or cooling means is advisable or not, through a consideration of the fact that the thoroughness of homogenization of the ingredients of the mixture is a function of the duration of the kneading action, whereas the speed of colloidalization is greatly influenced by the temperature, being increasingly faster as the temperature is raised and being retarded and, in fact, prevented completely if the temperature is lowered sufficiently.

In the specific examples a pressure of 10–50 pounds per square inch was used on the ram of the masticator mixer but the particular pressure is not in any way critical. Various mixers may be designed to operate under different pressures and the particular pressure is incidental as long as some positive pressure is exerted on the material to force it down into the small clearances and check the tendency of the material to merely ride around with the blades and avoid any kneading action at all.

The homogeneous, cellulous, friable mass may be immediately broken down into granular form upon removal from the mixer without waiting for the mass to cool. The reason for this is that in contradistinction to the ordinary continuous, horny masses produced by fully colloiding the cellulose ether, the cellulous friable mass obtained according to one alternative embodiment of the present invention possesses a very considerable degree of friability even at temperatures in the neighborhood of 80° C. and therefore it is quite feasible, as well as being highly economical, to grind the mass immediately upon its discharge in hot condition from the mixer. On the other hand, the fully colloided mass should be cooled to at least room temperature before grinding in order that the grinding may be done satisfactorily. Any suitable means may be used for reducing the compacted cellulose ethers to granular form such as a hammer mill, a rotary mill, a three-roll mill, and equivalent grinding mechanisms.

The homogeneous, cellulous, friable mass, as well as the fully colloided mass, obtained according to the present invention may be used for other purposes than the preparation of a molding compound. For example, it may be subjected, either with or without an intermediate grinding operation, to known plastics processes such as rolling, cake pressing, extrusion, dope making, and the like.

Among the advantages of the present invention are that it provides a process of forming a homogeneous, coherent, compacted molding composition without the use of volatile solvents which, as heretofore stated, involves additional expense. A further advantage of the present invention lies in the fact that the cellulose ethers may be worked into condition for use in molding powders without exposing them to high temperatures for prolonged periods, a material drawback inherent in the heretofore known processes of working cellulose ethers in the absence of volatile solvents. The shortness of the processing cycle according to the present invention is, of course, highly advantageous for economical operation as is the fact that, in one alternative embodiment of the invention, the cellulous, friable mass can be broken down into granular form immediately upon removal from the kneading apparatus without waiting for the material to cool. Not only does the present invention provide a process extremely economical in operation but it gives a molding composition eminently satisfactory both as to homogeneity and bulk density which means that it can be quickly and easily handled in the commercial pelleting and molding machines and gives a finished molded article uniform in appearance and composition throughout.

As many apparently widely different embodiments of this invention may be made without departing from the spirit and scope thereof, it is to be understood that the invention is not limited to the specific embodiments thereof except as defined in the appended claims.

We claim:

1. Process of preparing cellulose ether molding powders comprising kneading a mixture comprising a cellulose ether and a plasticizer therefor, stopping said kneading when said mixture is formed into a substantially homogeneous, compacted, coherent, cellulous, friable mass, and breaking down said mass into granular form.

2. Process of preparing cellulose ether molding powders comprising kneading in a masticator mixer under positive pressure a mixture comprising a cellulose ether and a plasticizer therefor, stopping said kneading when said mixture is formed into a substantially homogeneous, compacted, coherent, cellulous, friable mass, removing said mass from the mixer, and breaking down said mass into granular form.

3. Process of preparing cellulose ether molding powders comprising kneading in a masticator mixer under positive pressure a mixture comprising ethyl cellulose, a plasticizer therefor, and coloring matter, stopping said kneading when said mixture is formed into a substantially homogeneous, compacted, coherent, cellulous, friable mass, and breaking down said mass into granular form.

4. In the process of preparing cellulose ether molding powders, the steps of kneading a substantially water-free cellulose ether in comminuted form and stopping said kneading when said ether is formed into a substantially homogeneous, compacted, coherent, cellulous, friable mass.

5. A substantially water-free product comprising a cellulose ether in a homogeneous, compacted, coherent, cellulous form which is friable at temperatures above room temperature and adapted to be granulated to give a molding composition having a bulk density of about 6.6 grams per cubic inch at a screen analysis of:

|  |  | Percent |
|---|---|---|
| On | 10-mesh | 0.0 |
|  | 20-mesh | 37.5 |
|  | 40-mesh | 44.4 |
|  | 60-mesh | 13.4 |
|  | 80-mesh | 2.7 |
|  | 100-mesh | 1.0 |
| Through | 100-mesh | 0.8 |

6. A substantially water-free product comprising a cellulose ether and a plasticizer therefor, said product being in a substantially homogenous, compacted, coherent, cellulous form which is friable at temperatures above room temperature and adapted to be granulated to give a molding composition having a bulk density of about 6.6 grams per cubic inch at a screen analysis of:

|  |  | Percent |
|---|---|---|
| On | 10-mesh | 0.0 |
|  | 20-mesh | 37.5 |
|  | 40-mesh | 44.4 |
|  | 60-mesh | 13.4 |
|  | 80-mesh | 2.7 |
|  | 100-mesh | 1.0 |
| Through | 100-mesh | 0.8 |

7. A substantially water-free product comprising ethyl cellulose, a plasticizer therefor, and coloring matter, said product being in a substantially homogeneous, compacted, coherent form which is friable at temperatures above room temperature and adapted to be granulated to give a molding composition having a bulk density of about 6.6 grams per cubic inch at a screen analysis of:

|  |  | Percent |
|---|---|---|
| On | 10-mesh | 0.0 |
|  | 20-mesh | 37.5 |
|  | 40-mesh | 44.4 |
|  | 60-mesh | 13.4 |
|  | 80-mesh | 2.7 |
|  | 100-mesh | 1.0 |
| Through | 100-mesh | 0.8 |

MAURICE L. MACHT.
ALAN F. RANDOLPH.